(12) United States Patent
Lin

(10) Patent No.: US 8,619,329 B2
(45) Date of Patent: Dec. 31, 2013

(54) PRINT SMOOTHNESS ON CLEAR TONER ENABLED SYSTEMS

(75) Inventor: Guo-Yau Lin, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 574 days.

(21) Appl. No.: 12/945,179

(22) Filed: Nov. 12, 2010

(65) Prior Publication Data

US 2012/0120417 A1 May 17, 2012

(51) Int. Cl.
*H04N 1/405* (2006.01)

(52) U.S. Cl.
USPC ........... 358/3.06; 358/3.21; 358/2.1; 358/1.9; 358/3.01; 358/3.07; 358/3.22; 358/3.23; 358/3.27; 399/222; 399/231

(58) Field of Classification Search
None
See application file for complete search history.

(56) References Cited

U.S. PATENT DOCUMENTS

| | | | |
|---|---|---|---|
| 7,092,128 B2 | 8/2006 | Wang et al. | |
| 7,110,142 B2 | 9/2006 | Mestha et al. | |
| 7,148,999 B2 | 12/2006 | Xu et al. | |
| 7,180,635 B2 | 2/2007 | Wang et al. | |
| 7,301,675 B2 | 11/2007 | Wang et al. | |
| 7,304,770 B2 | 12/2007 | Wang et al. | |
| 7,755,802 B2 * | 7/2010 | Tai et al. | 358/3.24 |
| 8,373,896 B2 * | 2/2013 | Tsutsumi | 358/1.9 |
| 2006/0044617 A1 * | 3/2006 | Wang et al. | 358/3.06 |
| 2008/0079971 A1 | 4/2008 | Liu et al. | |
| 2009/0051979 A1 * | 2/2009 | Tai et al. | 358/463 |
| 2009/0258306 A1 | 10/2009 | Liu | |
| 2009/0296120 A1 * | 12/2009 | Tsutsumi | 358/1.9 |
| 2010/0191620 A1 * | 7/2010 | Sunata | 705/28 |
| 2010/0196035 A1 * | 8/2010 | Takemura | 399/67 |
| 2010/0202789 A1 | 8/2010 | Kimura et al. | |
| 2011/0052234 A1 * | 3/2011 | Tombs et al. | 399/68 |
| 2011/0058200 A1 * | 3/2011 | Miyahara et al. | 358/1.9 |
| 2011/0110590 A1 * | 5/2011 | Suzuki | 382/173 |

OTHER PUBLICATIONS

Wu et al., "Optimal Spot Color Recipes Using Variable GCR Profiles", U.S. Appl. No. 12/902,669, filed Oct. 12, 2010.

* cited by examiner

*Primary Examiner* — Hilina K Demeter
(74) *Attorney, Agent, or Firm* — Philip E. Blair; Fleit Gibbons Gutman Bongini & Bianco P.L.

(57) ABSTRACT

What is disclosed is a novel system and method for determining an amount of clear toner to be applied to a document image to improve smoothness in an output print rendered using a xerographic device capable of applying clear toner to the image in the image path. Using clear toner to improve smoothness enables a GCR strategy in which more black can be used. This, in turn, decreases the incremental cost for clear toner. The teachings hereof present attractive trade-offs for print shops specializing in color document reproduction and other customers of high-end xerographic devices capable of applying clear toner. Various embodiments are disclosed.

17 Claims, 6 Drawing Sheets

PRINT SMOOTHNESS ON CLEAR TONER ENABLED SYSTEMS

TECHNICAL FIELD

The present invention is directed to systems and methods for determining an amount of clear toner to be added to an image of a document to improve smoothness of an output print rendered on a xerographic device capable of applying a clear toner.

BACKGROUND

When printing large constant color or slowly transitioning area, smoothness is one of the main concerns. Smoothness is usually driven by the xerographic characteristics, halftone dot design, and can also be dependent on media substrate type. Toner scatter, unstable halftone dots, substrate materials (e.g. loose paper fiber), and the like, can prevent regions of color transition in an output print from appearing smooth. Applying clear toner is known to improve the smoothness. However, applying it to the entire print can be an expensive proposition. This is especially true for print shops specializing in color document reproduction. As such, methods are needed which can automatically determine, based upon characteristics of the document itself, where clear toner is best applied such that regions of color transition appear smooth.

Accordingly, what is needed in this art are systems and methods for determining an amount of clear toner to be added to a document image to improve smoothness of an output print in document reproduction devices capable of delivering an amount of clear toner to an image in the image path.

INCORPORATED REFERENCES

The following U.S. Patents, U.S. patent applications, and Publications are incorporated herein in their entirety by reference.

"Optimal Spot Color Recipes Using Variable GCR Profiles", U.S. patent application Ser. No. 12/902,669 to Wu et al., filed Oct. 12, 2010, "Image Forming Apparatus And Image Forming Method", U.S. Publication No. 20100202789, to Kimura et al.

"Enhancement Of Glossmark Images At Low And High Densities With Selective Application Of Clear Toner", U.S. Publication No. 20080079971, to Liu et al.

"Toner Image Stabilization Processes", U.S. Publication No. 20090258306, to Liu et al.

"Reduction Of Differential Gloss With Halftoned Clear Toner", U.S. Pat. No. 7,304,770, to Wang et al.

"Application Of Glossmarks For Graphics Enhancement", U.S. Pat. No. 7,092,128, to Wang et al.

"Halftone Image Gloss Control For Glossmarks", U.S. Pat. No. 7,180,635, to Wang et al.

"Variable Glossmark", U.S. Pat. No. 7,148,999, to Xu et al.

"Glossmark Images With Clear Toner", U.S. Pat. No. 7,301,675, to Wang et al.

"Systems And Methods For Sensing Marking Substrate Area Coverage Using A Spectrophotometer", U.S. Pat. No. 7,110,142, to Mestha et al.

BRIEF SUMMARY

What is disclosed is a novel system and method for determining an amount of clear toner to be applied to a document image to improve smoothness in an output print rendered using a xerographic device capable of applying clear toner to the image in the image path. Using clear toner to improve smoothness advantageously enables a Gray Component Replacement (GCR) strategy in which more black can be used which can decrease the incremental cost for clear toner for print shops specializing in color document reproduction.

In one example embodiment, the present method for determining where to apply clear toner to an image of a document to improve smoothness in an output print involves performing the following. First, an image of a document is received. The received document image is intended to be rendered on a document reproduction device capable of applying clear toner in the image path. The received document image is then analyzed to detect objects contained within the document. The objects can be, for example, constant color objects, smooth shading objects, and image objects. Document objects can be selected via a user interface of a computer workstation. Once the objects have been identified, an amount of halftone dot area coverage is determined for one or more regions of each object wherein color transitions occur. The determined amount of halftone dot area coverage for a given region is then compared to a predetermined threshold. If the amount of area coverage is below the predetermined threshold, the document reproduction device is signaled to apply clear toner to this region. Excessive clear toner can be removed via an ink-limiting operation. In other embodiments, a rate of color transition in the object region is determined and then compared to a predetermined transition threshold in a spatial domain. If the rate of color transition is below the transition threshold then the device is signaled to apply clear toner to the region.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
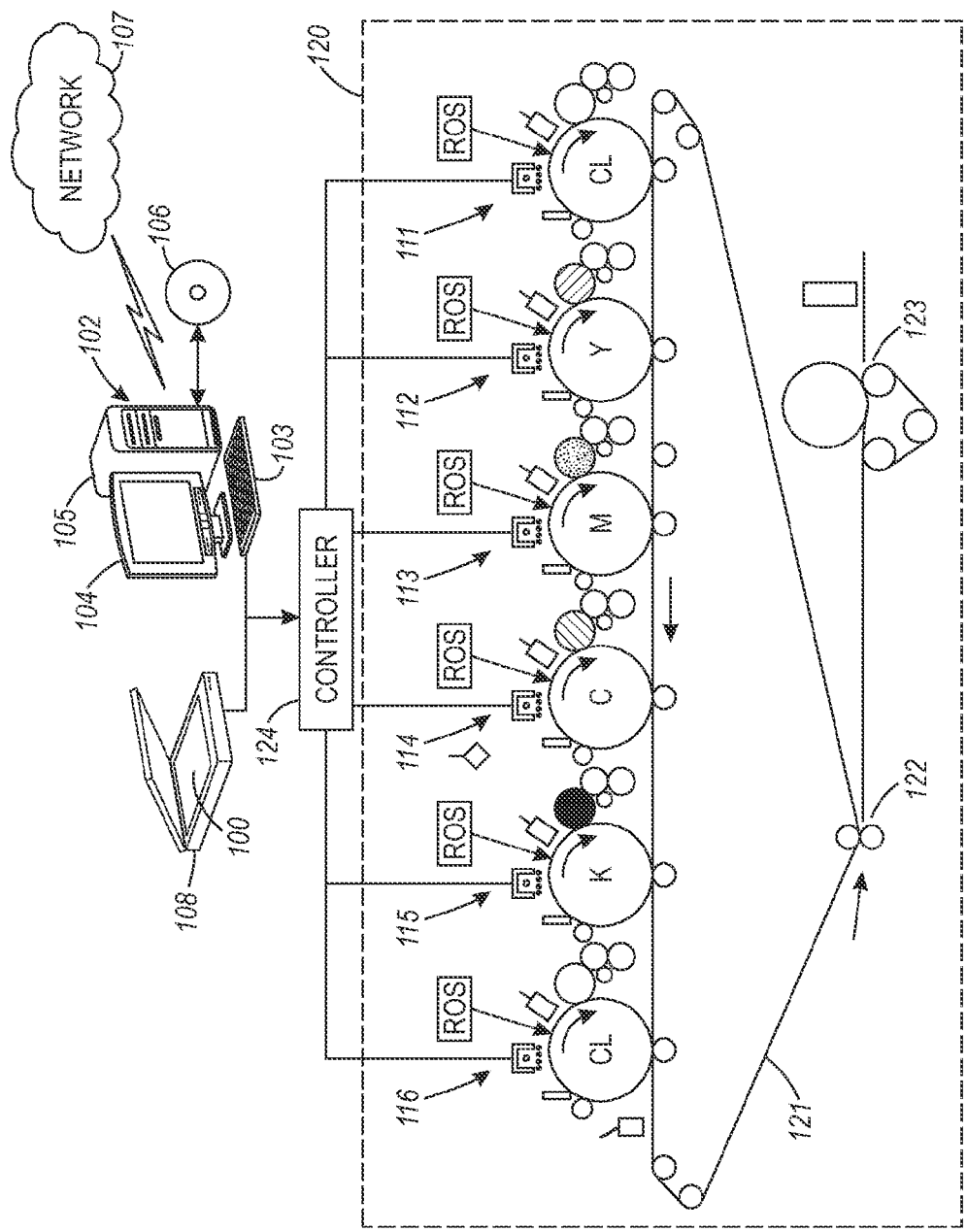
FIG. 1 is an explanatory view of system of a computer workstation and scanning device in communication with an example embodiment of an image forming apparatus capable of applying clear toner.

What is disclosed is a novel system and method for determining an amount of clear toner to be applied to a document image to improve smoothness in an output print rendered using a xerographic device capable of applying clear toner to the image in the image path.

It should be understood that one of ordinary skill in this art should be readily familiar with the various aspects of document reproduction systems including control systems which enable such devices to apply clear toner to one or more regions of a document image in the image path. Those of ordinary skill in this art would be familiar with the text: "*Digital Color Imaging Handbook*", 1st Ed., CRC Press (2003), ISBN-13: 97808-4930-9007, and "*Control of Color Imaging Systems: Analysis and Design*", CRC Press (2009), ISBN-13: 97808-4933-7468, both of which are incorporated herein in their entirety by reference.

Non-Limiting Definitions

"Clear toner" is toner, as is well understood, which has no visually discernable color when applied to an image of a document in the image path. As with other toners, clear toner is fixed to the image though an application of heat. Multi-function document reproduction systems may have more than one marking engine in the image path capable of applying clear toner. An example embodiment of one such system is shown and discussed with respect to FIG. 1. Clear toner is intended to refer to transparent ink, varnish coating, UV coating, and the like, as are understood in the arts.

A "document image" or "image of a document" refers to a digital image of a hardcopy document which has been scanned into a digitized form using an image input device, as are generally known. A document image is intended to be processed in accordance with the teachings hereof.

An "object" or "document object" means color critical content contained within the document image. Content objects are positioned on a background typically composed of white space or other uniformly colored background and include, for example, text, pictures, graphics, charts, images, and the like. Content objects can be broadly categorized as being either: constant color objects, smooth shading objects, and image objects. Objects contained within a document image can be readily detected, isolated, and extracted from a respective document using document content analyzing techniques that are well established in the document reproduction arts.

"Halftone dot area coverage" refers to a measure of the reproduction of individual separation colors. Systems and methods for measuring and determining the amount of area coverage of a halftone dot are well known. A multiple-LED sensor can be used, for example, to detect an amount of area coverage on a marking substrate using reflectance measurements. A Neugebauer model can be employ to facilitate such measurements. A Least Squares Algorithm can be used to estimate the appropriate parameters of the Neugebauer model. For improved accuracy, a Recursive Least Squares Algorithm can be used to enable the area coverage sensor to calibrate itself to changes in sensing environment. For the purpose of measuring the dot area coverage for single separation colors such as cyan, magenta, yellow, etc., the number of primaries is preferably limited to those reproduced by the single separation color and the base color of the marking substrate, i.e., the color of the original marking substrate before being marked.

An "image input device" is a device capable of producing a document image. The set of image input devices is intended to encompass a wide array of devices such as: scanners, cameras, photography equipment, facsimile machines, and the like, capable of producing a document image from a hardcopy print. Such devices may be placed in communication with computer workstations, memory and storage devices, networked platforms such as servers and client devices, and other multi-function devices. One example image input device that optically scans a hardcopy print of a document and converts that document into a document image is flatbed device 108 of FIG. 1.

An "image output device" is intended to refer to any document reproduction system having an image forming apparatus capable of applying clear toner in the image path. One example image forming apparatus 120 is shown and discussed with respect to the tandem system of FIG. 1.

Example Controller in the Image Path

Reference is now being made to FIG. 1 which provides an explanatory view of system wherein a computer workstation and scanning device are placed in communication with an example image forming apparatus 120 capable of applying clear toner in the image path of a document reproduction device.

The system of FIG. 1 is shown generally comprising a computer workstation 102 which includes a keyboard 103, monitor 104, computer case 105 which houses a motherboard, processor, hard drive, CD-ROM drive, and a network interface card (not shown), to name a few components. The workstation also includes rewriteable media 106 for storing machine readable program instructions and data. Workstation 102 is in communication with one or more devices over network 107. Also shown is an example image input device, shown as flatbed scanner 108 which functions to convert a hardcopy print of a document into a digital representation thereof. Such an image input device utilizes specialized receptors moving beneath platen 110 to scan the document placed thereon. A digital signal is generated which contains, in various embodiments, information about the scanned document. Such information may take the form of pixel color, color intensity, and the like. Such signals collectively form a digital representation of the scanned hardcopy print.

The image forming apparatus 120 of FIG. 1 is a tandem system having a plurality of marking engines 111-116 arranged adjacent to a rotating intermediate transfer belt 121. Intermediate transfer belt 121 is an endless belt driven preferably at a uniform speed, passing through the primary transferring device in each of the color marking engines, and a toner image formed by each of the color marking engines is transferred and superposed thereon. The intermediate belt may be provided with a cleaning apparatus for removing toner and other foreign particles such as paper dust. The illustrated tandem system also includes a secondary transferring device 122, a fixing device 123, and a controller 124 for controlling the various components of the image forming apparatus. Secondary transferring apparatus 122 serves to transfer the toner image from the intermediate belt to a media, such as paper. Fixing apparatus 123 executes a fixing process through an application of heat and pressure, thereby fixing the image to the paper using xerographic processes that are well known. Since the intermediate belt 121, secondary transferring apparatus 122 and fixing apparatus 123 are well-known, a more detailed description hereof has been omitted. Controller 124 is capable of receiving information and instructions from workstation 102 and from image input device 108.

Marking engines 111-116 serve to form images by using different toners. Marking engines 112-115 form images using, in the embodiment shown, color toners corresponding to yellow (Y), magenta (M), cyan (C), and black (K), respectively. Marking engines 111 and 116 apply clear toner (CL). The plurality of marking engines collectively form an image through well understood xerographic processes of charging, exposure, development, transfer, etc. Each of the marking engines has a photosensitive drum which serves as an image carrier. The photosensitive drums are driven by a motor (not shown). Each marking engine also comprises a charging apparatus for uniformly charging the surface of the drum, an exposing device (ROS) for forming an electrostatic latent image on the surface of the photosensitive drum, a developing system for developing the electrostatic latent image on the photosensitive drum, a primary transferring device for transferring the toner image onto the intermediate transfer belt 121, and a cleaning device for removing toner from the drum in preparation for the formation of a next image.

Controller 124 includes a Central Processing Unit (CPU) and control various operations of the image forming apparatus 120. Controller 124 recognizes a distinction between an image portion and a non-image portion, referring to image information which is the basis for forming an image in each of the marking engines. The image portion is a portion in which a toner image is formed by an application of toner to the image forming region on the image carrier. One example distinction between the image portion and a non-image portion is the ability of the controller to recognize whether a given pixel of the image is ON/OFF. When the distinction between the image portion and the non-image portion is recognized, an operating instruction or signal is sent by controller 124 to certain of the marking engines to cause the order of formation of toner to be applied to form image portions on intermediate transfer belt 121. In carrying out operational control of image forming apparatus 120, controller 124 sets a formation order. In one formation order, color toner is applied to the image portion before clear toner is applied. The controller may set a formation order in which the forming orders of the clear toner and the color toners are different. For instance, in case of a background for example, the toner image may be formed with clear toner, the Y-toner, the M-toner, C-toner, and K-toner, in that order. On the other hand, the forming orders of the clear toner and the color toners may be different such that a clear toner layer is positioned as the lowermost layer and the color layers are deposited thereafter. In the non-image portion, the forming order may be such that the clear toner layer is positioned on the uppermost layer. In addition, clear toner may be positioned as the lowermost layer in the image portion and deposited as the uppermost layer. The marking engines form images on different portions of the intermediate belt during one rotation of the belt (i.e., a period when the belt passes through the image forming portions). In the embodiment of FIG. 1, two marking engines 111 and 116 capable of applying clear toner are provided such that in the case in which the orders of formation of the clear toner and the color toners are to be different in the image portion and in the non-image portion.

One of ordinary skill in the xerographic arts would appreciate that the tandem architecture of the image forming apparatus of FIG. 1 may alternatively be replaced by a rotary system having a single image forming portion with a structure in which a plurality of marking/developing devices are disposed on a single rotating apparatus. Such devices would include functionality for forming an image using a plurality of color toners in addition to clear toner. Moreover, such a tandem and/or rotary system may comprise an n-color image forming apparatus such as, for example, CMYKOV in addition to one or more marking engines capable of applying a determined amount of clear toner. The controller is capable of signaling the marking engines to apply toner in a specific amount to one or more regions of the image.

In one embodiment, workstation 102 performs various aspects of the present method and signals controller 124 to apply color and clear toners to one or more regions of objects detected in the document image. In another embodiment, controller 124 performs the various determinations in accordance herewith and signals marking engines 111-116 to apply toner to the image being formed. Various aspects of the controller itself may be controlled by the workstation or be internal to the workstation. In such an embodiment, the controller may comprise, for example, a PCI board or on-board chip or dedicated processor placed in communication with the CPU and memory of the workstation. The controller may utilized some of the hardware, software, and other resources of the workstation and may further communication to one or more remote devices over network 107 using communication devices and pathways not shown. One example device is shown and described herein further with respect to the special purpose computer of FIG. 6. A buffering mechanism may be utilized to store detected objects/regions for analysis and processing in accordance herewith. Various software data structures may also be implemented to serve as a buffer. Other buffering mechanisms, such as dedicated memory may also be utilized depending on the computing environment wherein the present method finds its uses.

Flow Diagram of Example Embodiment

Figure 2:
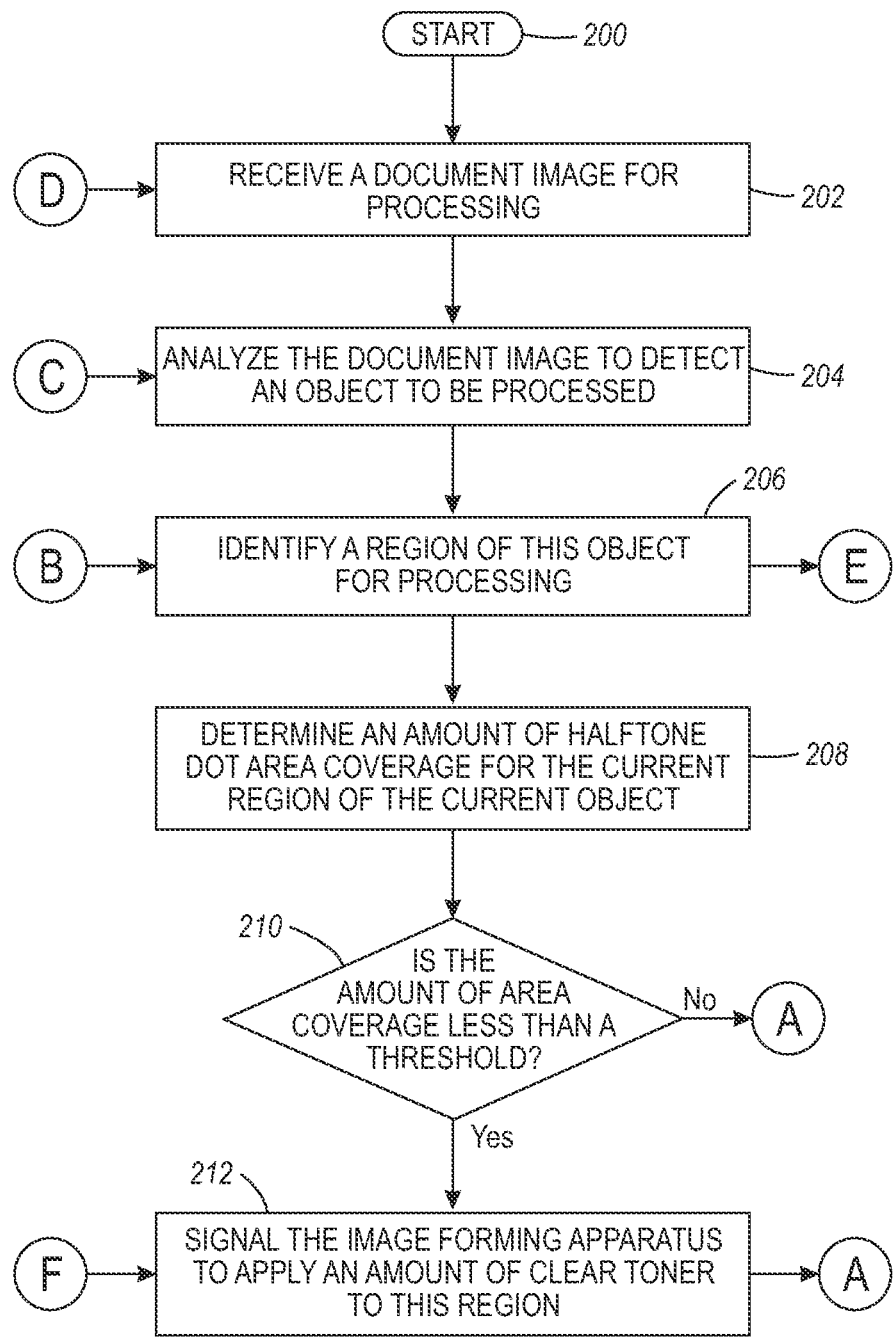
FIG. 2 is a flow diagram of one example embodiment of the present method for determining where to apply clear toner to an image of a document to improve smoothness.
Figure 3:
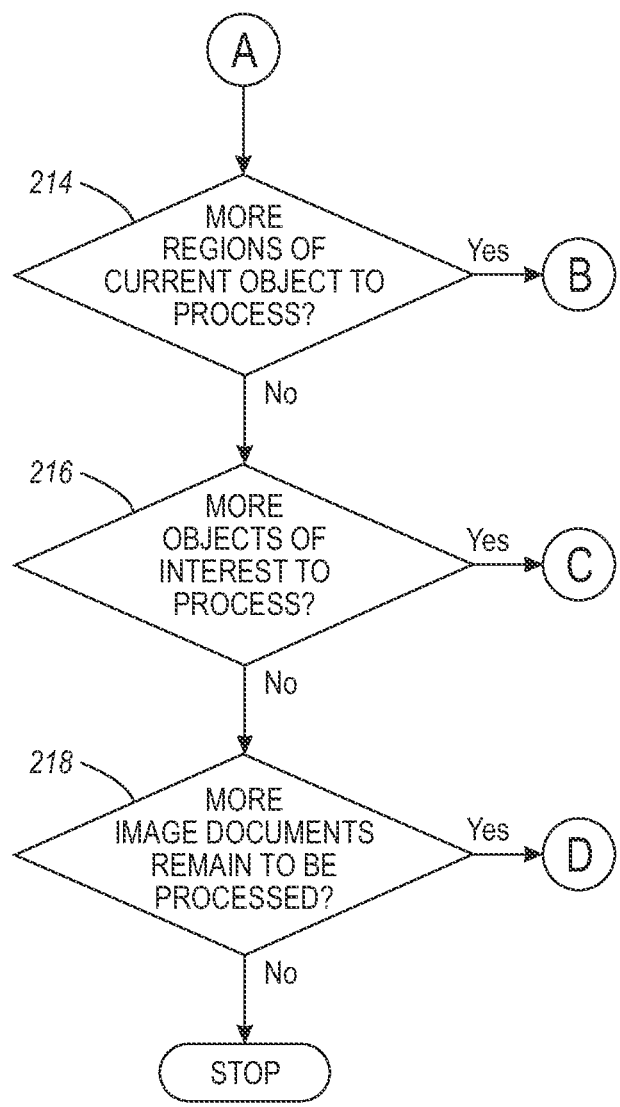
FIG. 3 is a continuation of the flow diagram of FIG. 2 with flow processing continuing with respect to node A.

Reference is now being made to the flow diagrams of FIGS. 2 and 3, which illustrate one example embodiment of the present method for determining where to apply clear toner to an image of a document to improve smoothness in an output print. Various aspects of the present method may be performed by either the computer workstation and/or the controller of FIG. 1 and the various components and modules shown and discussed with respect to the embodiment of FIG. 5. Flow processing begins at step 200 and immediately proceeds to step 202.

At step 202, an image of a document is received. The received document image is intended to be rendered on a document reproduction device capable of applying clear toner to an output print. The document image may be received from a remote device over a network such as network 107 or, for example, using the flatbed scanner 108 of FIG. 1 or the image input device 503 of FIG. 5. Another example of document image may be the digitally created and stored pages in the page description language, or PDL.

At step 204, the received document image is analyzed to detect a first object contained within the document. The object can be, for example, a constant color object, smooth shading object, and an image object. In various embodiments, objects are selected by a user using, for example, the user interface of the workstations of FIGS. 1 and 5. In another embodiment, instructions are received over a network from a remote device such as, for example, a document analyzer capable of receiving the image document and analyzing the received document image for content. Such a remote device would then communicate objects found in the document image to the workstation for further processing.

At step 206, identify a first region of this object to be processed.

At step 208, determine an amount of a halftone dot area coverage for the current region of the current object. Methods for determining the amount of area coverage for a halftone dot are well established.

At step 210, a determination is made whether the amount of halftone dot area coverage is below a predetermined threshold. If the determined amount of area coverage is below the predetermined threshold then, at step 212, the image forming apparatus is signaled to apply clear toner to this region. Such a signal may take the form of instructions sent via a communications interface from the computer workstation to a controller of the image forming apparatus. One such tandem type system is shown in FIG. 1 wherein controller 124 instructs marking engines 111 and 116 to apply an amount of clear toner to a specific region of the image being formed. The amount of clear toner to be applied may be ink limited such that excessive toner is removed. If, at step 210, the determined amount of area coverage is, in this embodiment, at or above the predetermined threshold then no clear toner is applied to this region and processing continues with respect to node A of FIG. 3.

Reference is now being made to the flow diagram of FIG. 3 which is a continuation of the flow diagram of FIG. 2 with processing continuing with respect to node A.

At step 214, a determination is made whether this object contains more regions to be processed. If so then processing repeats with respect to node B wherein, at step 206, and another region of the current object is identified for processing. For the next identified region of the current object, processing continues with respect to step 208 wherein an amount of halftone dot area coverage is determined for this next region. Processing repeats in such a manner until all regions for the current object have been processed.

If, at step 214, no more regions of interest remain to be processed for the current object then, at step 216, a determination is made whether any more objects remain to be processed. If so then processing repeats with respect to node C wherein, at step 204, a next detected object is selected for processing. Processing repeats for this next object until there are no more regions remaining to be processed. Processing continues until all objects intended to be processed in the current document image have been processed. After all objects have been processed for the current document image, at step 218, a determination is made whether more document images remain to be processed. If so, then continues with respect to node D wherein, at step 202, a next document image is received. Processing repeats in a similar manner for this next image document until all desired document images have been processed. Thereafter, further processing stops.

Alternative Embodiment

Figure 4:
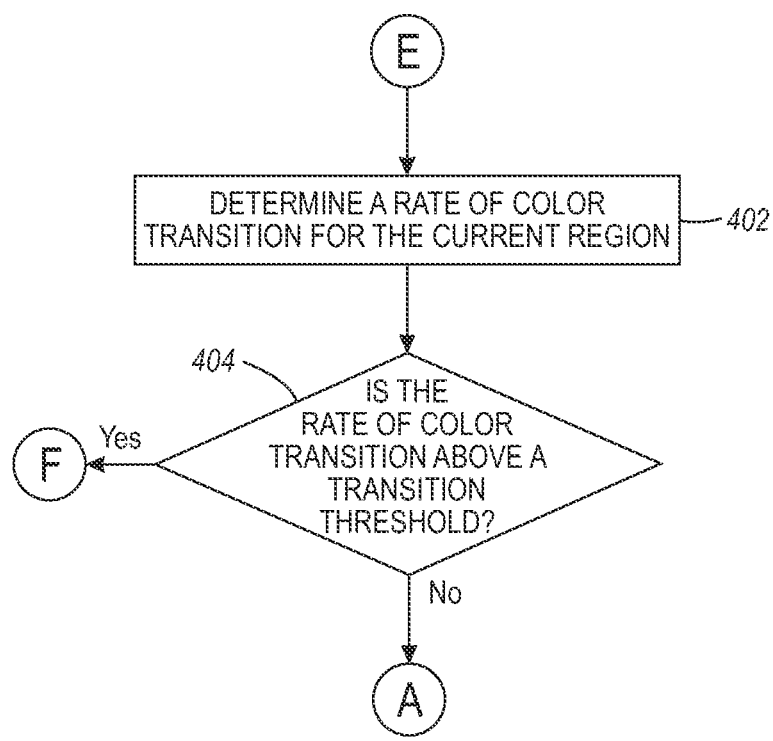
FIG. 4 illustrates an alternative embodiment to the method of FIGS. 2 and 3, with flow processing continuing with respect to node E.

Attention is respectfully directed to the flow diagram of FIG. 4 which illustrates an alternative embodiment to the method of FIGS. 2 and 3, with flow processing continuing with respect to node E.

In this embodiment, after a region of the current object has been identified or otherwise selected for processing in step 206 of FIG. 2, processing proceeds to node E wherein, at step 402, a rate of color transition in the current region is determined. At step 404, a determination is made whether the determined rate of color transition is above a predetermined transition threshold. If so, then processing continues with respect to node F wherein, at step 212, the image forming apparatus is signaled to apply clear toner to this region. Processing continues with respect to step 214 of FIG. 3 wherein a determination is made whether any more regions in this current object remain to be processed. If so then control passes back to step 206 wherein a next region of the current object is selected for processing. Upon selection of a next region for processing, control returns to node E wherein, at step 402, the rate of color transition for this next region is determined. At step 404, the determined rate of color transition is compared to the predetermined transition threshold. If the rate of color transition is above the transition threshold then processing again returns to node F wherein, at step 212, the image forming apparatus is signaled to apply clear toner to this region. Processing repeats for all identified regions in the current object. Once all regions of interest for the current object have been processed accordingly, processing continues with respect to node A wherein, at step 214, a determination is made whether any more objects remain to be processed. If so then processing continues with respect to node B wherein, at step 206, a next object is identified for processing. Processing continues in such a manner until all objects intended to be processed in the current document image have been processed accordingly.

Once all the objects have been processed, at step 218, a determination is made whether any more document images remain to be processed. If so then processing continues with respect to node D wherein, at step 202, a next document image is received. Processing continues until there are no more document images to process. Thereafter, in this embodiment, further processing stops.

Example Document Image Processing System

Figure 5:
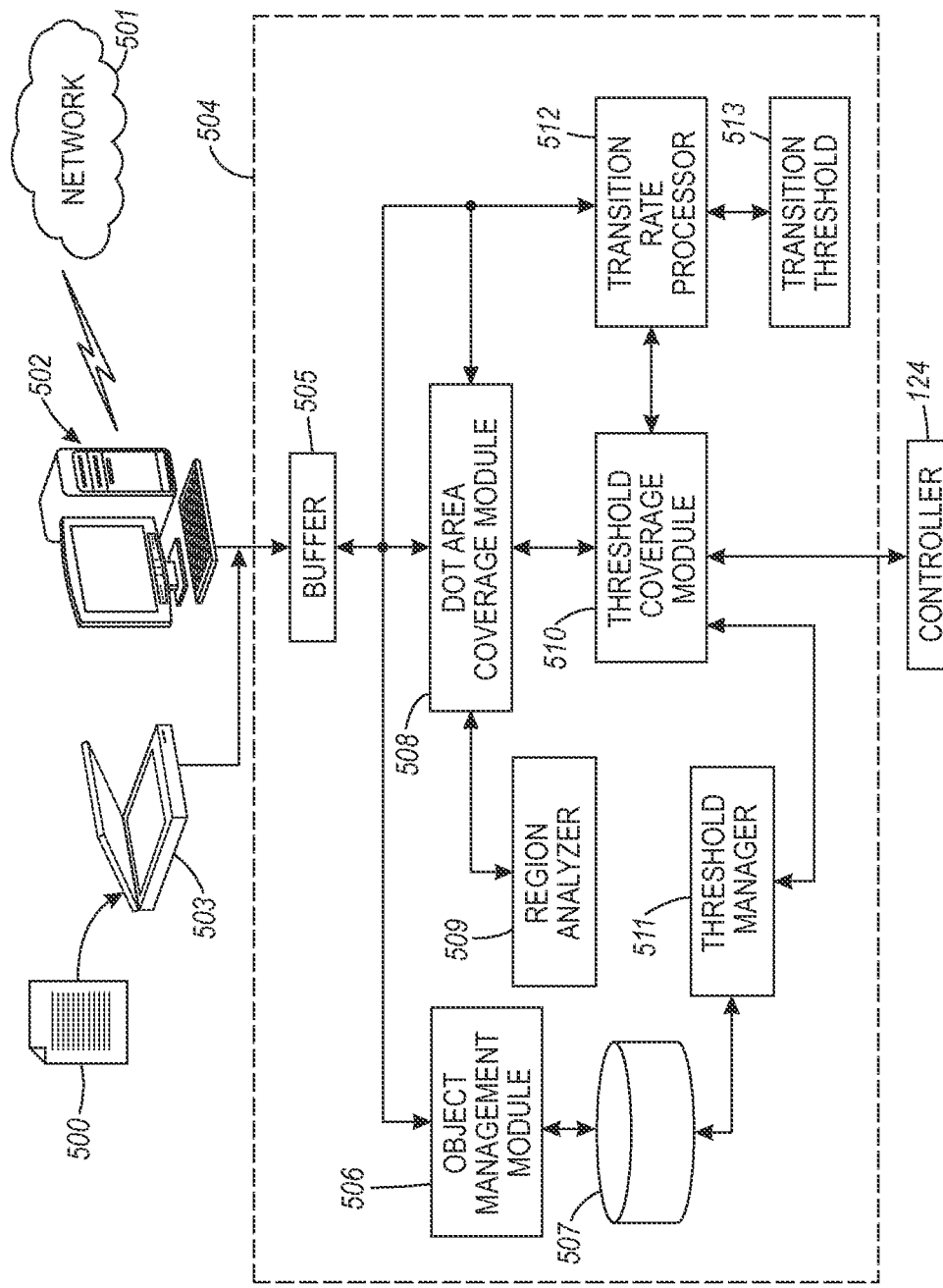
FIG. 5 illustrates a block diagram of one example document image processing system wherein various aspects of the present method as shown and described with respect to the flow diagrams of FIGS. 2, 3 and 4, are performed.

Reference is now being made to the block diagram of FIG. 5 which illustrates one example document image processing system wherein various aspects of the embodiment described with respect to the flow diagrams of FIGS. 2, 3 and 4, are performed.

The embodiment of FIG. 5 is shown comprising a workstation 502 having many of the same elements as described with respect to the computer workstation 102 of FIG. 1. The workstation is shown in communication with image input device 503. Computer system 502 is shown also in communication with network 501 via a network communications interface (not shown). Document 500 is placed on the platen of scanning device 503 and scanned into a digitized form to obtain the received document image. In this embodiment, the received document image is communicated to workstation 502 for processing. All or portions of the document image may be stored to a memory or storage device internal to workstation 502 and may be communicated to a remote device over network 501 for further processing. A user may use the graphical user interface, e.g., keyboard and monitor, of computer workstation 502 to identify or otherwise select content objects contained within the received document image and/or identify one or more regions within various objects for processing in accordance with the teachings hereof. Alternatively, objects and/or regions of objects of interest or information about the received document such as, for instance, object location, a number and type of regions of various objects of interest identified or otherwise detected in the received image document, or in a form of PDL, may be received from a remote device, such as a document processing system or content object detection system, over network 501. Computer workstation 502 and the image input device 503 are shown in communication with document image processing system 504.

Document image processing system 504 is shown comprising a buffer 505 for queuing information relating to document 500 such as, for instance, objects, object/region location, object/regions of interest, and the like. The buffer 505 may further store retrieved data and mathematical formulas and representations to process the content objects in the above-described manner. Image processing system 504 comprises a plurality of modules which designate various system components. Object Management Module 506 stores/retrieves objects and information about the objects to storage device 507 which may be any device or system capable of storing documents or images. One embodiment of a storage device is a database, as are well known in the arts. Storage devices include RAM, ROM, Cache Memory, CD-ROM, DVD, flash drives, hard drives, and other volatile or non-volatile storage media.

Dot Area Coverage Module 508 determines an amount of halftone dot area coverage for a region of an object. Module 508 is in communication with buffer 505 and receives the current object being processed and provides, as output, an amount of halftone dot area coverage. Region Analyzer 509 analyzes an object and determines regions of smooth transition inside image objects and provides an identification of those object regions to Dot Area Coverage Module 508. Region Analyzer 509 is in communication with storage device 507 wherein various values are stored for subsequent retrieval. Threshold Comparator Module 510 receives the determined amount of halftone dot area coverage and compares that amount to a predetermined threshold received from Threshold Manager Module 511. Manager Module 511 is in communication with storage device 507 wherein various predetermined threshold values are stored. Threshold Manager 511 may further be in communication with the user interface of workstation 502 to query the user for one or more threshold values or may receive the predetermined threshold values from a remote device over a network. It should be understood that any of the modules of system 504 are in communication with storage device 507 and in communication with workstation 502 and/or one or more remote devices over network 501. If Threshold Comparator Module 510 determines that the amount of area coverage is below the predetermined threshold then controller 124 of image forming apparatus 120 of FIG. 1 is signaled to apply clear toner to this region. Such a signal may take the form of instructions sent, via a communications interface, from the computer workstation. Controller 124, in turn, instructs one or more marking engines of image forming apparatus 120, such as marking engines 111 and 116 of FIG. 1, to apply an amount of clear toner to the image being formed. Transition Rate Processor 512 interfaces with Dot Area Coverage Module 508 and Threshold Comparator Module 510 and is in further communication with Transition Threshold Manager 513. Both the Transition Rate Processor Module 512 and the Transition Threshold Manager 513 collectively perform the embodiment discussed with respect to the flow diagram of FIG. 3 wherein a rate of color transition in the region of the object is determined. The determined rate of color transition is then compared to a predetermined transition threshold in the spatial domain provided by Manager Module 513. Threshold Comparator Module 510 receives the rate of color transition from Transition Rate Processor 512 and receives the predetermined transition threshold value from the Threshold Manager 513.

Figure 6:
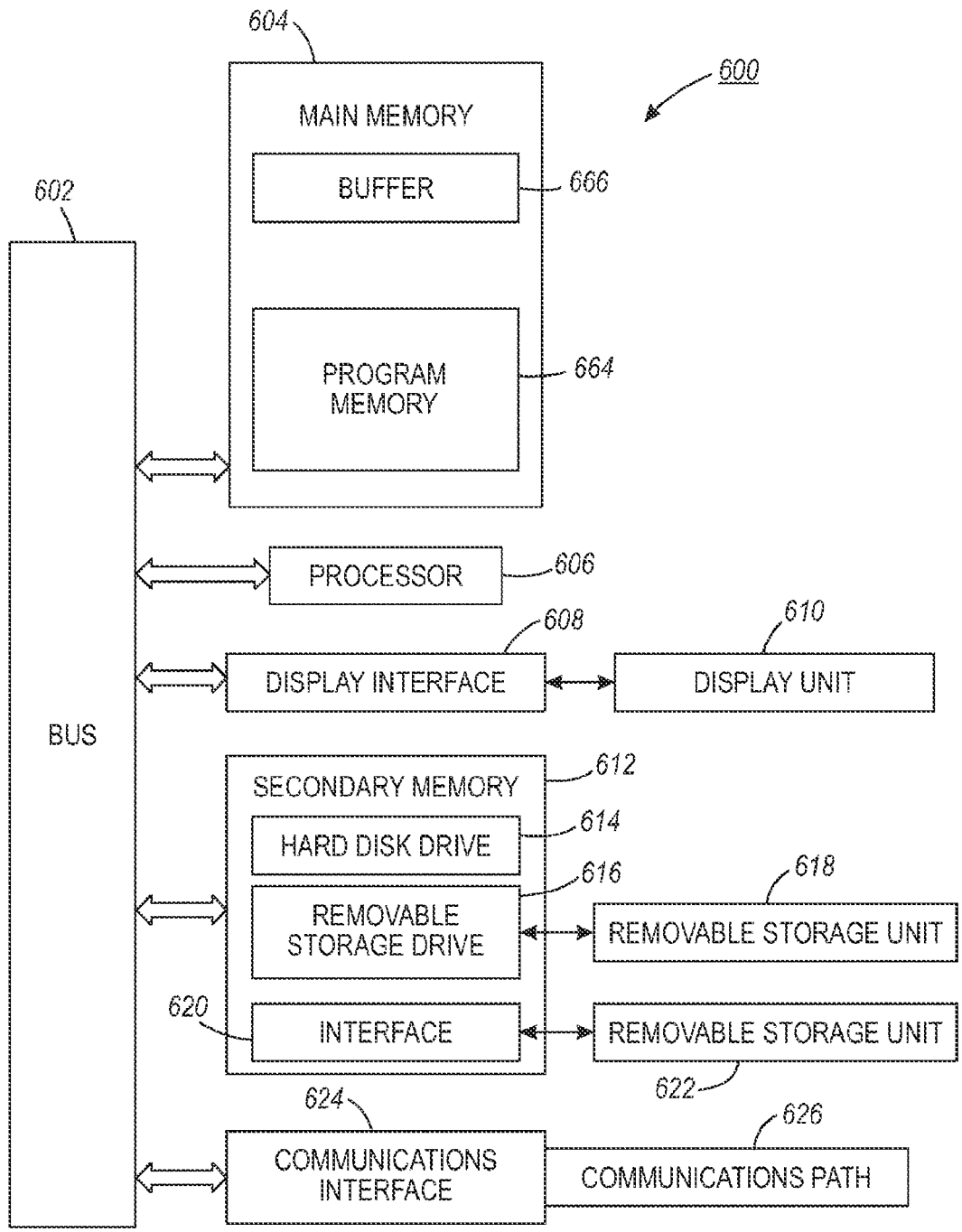
FIG. 6 illustrates a block diagram of one example embodiment of a special purpose computer system for performing one or more aspects of the present system and method as described with respect to the flow diagrams of FIGS. 2, 3 and 4, and the functional block diagram of FIG. 5.

It should be appreciated that any of the modules described with respect to the block diagram of FIG. 5 may be in communication with computer workstation 502. Some or all of the functionality for any of the modules may be performed, in whole or in part, by components internal to workstation 502 or by a special purpose computer system as shown in FIG. 6. It should be appreciated that various modules may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network.

It is also contemplated that one or more aspects of the present method may be implemented on a dedicated computer system and may also be practiced in distributed computing environments where tasks are performed by remote devices that are linked through a network. It is also contemplated that the teachings hereof will be applied to various printing systems using different technologies including xerography, ink-jet system, offset press, and lithography.

Example Special Purpose Computer System

Reference is now being made to FIG. 6 which illustrates a block diagram of one example embodiment of a special purpose computer system for implementing one or more aspects of the present method as described with respect to the flow diagrams of FIGS. 2, 3 and 4, and the functional block diagram of FIG. 5. Such a special purpose processor is capable of executing machine executable program instructions. The special purpose processor may comprise any of a micro-processor or micro-controller, an ASIC, an electronic circuit, or special purpose computer. Such a computer can be integrated, in whole or in part, with a xerographic system or a color management or image processing system, which includes a processor capable of executing machine readable program instructions for carrying out one or more aspects of the present method.

Special purpose computer system 600 includes processor 606 for executing machine executable program instructions for carrying out all or some of the present method. The processor is in communication with bus 602. The system includes main memory 604 for storing machine readable instructions. Main memory may comprise random access memory (RAM) to support reprogramming and flexible data storage. Buffer 666 stores data addressable by the processor. Program memory 664 stores machine readable instructions for performing the present method. A display interface 608 forwards data from bus 602 to display 610. Secondary memory 612 includes a hard disk 614 and storage device 616 capable of reading/writing to removable storage unit 618, such as a floppy disk, magnetic tape, optical disk, etc. Secondary memory 612 may further include other mechanisms for allowing programs and/or machine executable instructions to be loaded onto the processor. Such mechanisms may include, for example, a storage unit 622 adapted to exchange data through interface 620 which enables the transfer of software and data. The system includes a communications interface 624 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 626 which carries such signals and may be implemented using wire, cable, fiber optic, phone line, cellular link, RF, memory, or other means known in the arts.

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned, and are intended to fall within the scope of the appended claims. All or portions of the flow diagrams may be implemented partially or fully in hardware in conjunction with machine executable instructions in communication with various components of such a system.

The methods described can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine, that is in turn capable of implementing one or more elements of the flow diagrams provided herewith, or portions thereof, can be used. The teachings hereof can be implemented in hardware or software using any known or later developed systems, structures, devices, and/or software by those skilled in the applicable art without undue experimentation from the functional description provided herein with a general knowledge of the relevant arts. The methods hereof can be implemented as a routine embedded on a personal computer or as a resource residing on a server or workstation, such as a routine embedded in a plug-in, a photocopier, a driver, a scanner, a photographic system, a xerographic device, or the like.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for determining where to apply clear toner to an image of a document to improve smoothness in an output print, the method comprising:
    receiving an image of a document intended to be rendered on a document reproduction device capable of applying clear toner to an output print;
    analyzing said document image to detect at least one object contained within said document;
    determining an amount of halftone dot area coverage in at least one region of said object;
    determining a rate of color transition in said region of said object; and
    in response to said determined rate of color transition being below a predetermined transition threshold in a spatial domain, applying clear toner to said object region.

2. The method of claim 1, wherein said detected object comprises any of: a constant color object, smooth shading object, and an image object.

3. The method of claim 1, wherein, in response to said area coverage being below said threshold, further comprising ink-limiting said amount of clear toner to be applied such that excessive toner is removed.

4. The method of claim 1, wherein said region of said object comprises an area wherein one color transitions to another color.

5. The method of claim 1, wherein said document reproduction device applies said clear toner in response to receiving a signal.

6. The method of claim 1, further comprising selecting said document object via a user interface of a graphical display device.

7. A system for determining where to apply clear toner to an image of a document to improve smoothness in an output print, the system comprising:
    a controller which regulates the application of clear toner to a document image in the image path of a document reproduction device;
    a memory and a storage medium; and
    a processor in communication with said controller, and memory and storage medium, said processor executing machine readable instructions for performing the method of:
        receiving an image of a document intended to be rendered on a document reproduction device capable of applying clear toner to an output print;
        analyzing said document image to detect at least one object contained within said document;
        determining an amount of halftone dot area coverage in at least one region of said object;
        determining a rate of color transition in said region of said object; and
        in response to said determined rate of color transition being below a predetermined transition threshold in a spatial domain, signaling said controller to apply clear toner to said object region.

8. The system of claim 7, wherein said detected object comprises any of: a constant color object, smooth shading object, and an image object.

9. The system of claim 7, wherein, in response to said area coverage being below said threshold, further comprising ink-limiting said amount of clear toner to be applied such that excessive toner is removed.

10. The system of claim 7, wherein said region of said object comprises an area wherein one color transitions to another color.

11. The system of claim 7, wherein said document reproduction device applies said clear toner in response to receiving a signal.

12. The system of claim 7, further comprising selecting said document object via a user interface of a graphical display device.

13. A computer implemented method for determining where to apply clear toner to an image of a document to improve smoothness in an output print, the method comprising:
    receiving an image of a document intended to be rendered on a document reproduction device capable of applying clear toner to an output print;
    analyzing said document image to detect objects contained within said document, said detected objects comprising any of: a constant color object, smooth shading object, and an image object; and for each detected object in said document image:
  determining an amount of halftone dot area coverage in at least one region of said object;
  determining a rate of color transition in said region of said object; and
  in response to said determined rate of color transition being below a predetermined transition threshold in a spatial domain:
    ink-limiting said amount of clear toner to be applied such that an amount of excessive toner to be applied is removed; and
    signaling said document reproduction device to apply said ink-limited clear toner to said object region.

14. The method of claim 13, wherein said region of said object comprises an area wherein one color transitions to another color.

15. The method of claim 13 wherein said document reproduction device applies said clear toner in response to receiving a signal from a device controller.

16. The method of claim 13, further comprising selecting said document object via a user interface of a graphical display device.

17. The method of claim 13, wherein said amount of clear toner to be applied to each region of each of said detected objects is provided to a storage device for subsequent retrieval.

* * * * *